US012481775B2

(12) United States Patent
Shibusawa et al.

(10) Patent No.: US 12,481,775 B2
(45) Date of Patent: Nov. 25, 2025

(54) DATA PROCESSING METHOD, DATA PROCESSING APPARATUS, AND DATA PROCESSING PROGRAM

(71) Applicant: NTT, Inc., Tokyo (JP)

(72) Inventors: Ushio Shibusawa, Musashino (JP); Teruhisa Inoue, Musashino (JP); Shunsuke Takamiya, Musashino (JP); Maiko Imoto, Musashino (JP); Fanglu Xie, Musashino (JP); Soichiro Uchida, Musashino (JP)

(73) Assignee: NTT, Inc.

( * ) Notice: Subject to any disclaimer, the term of this patent is extended or adjusted under 35 U.S.C. 154(b) by 91 days.

(21) Appl. No.: 18/570,840

(22) PCT Filed: Jun. 21, 2021

(86) PCT No.: PCT/JP2021/023459

§ 371 (c)(1),
(2) Date: Dec. 15, 2023

(87) PCT Pub. No.: WO2022/269710

PCT Pub. Date: Dec. 29, 2022

(65) Prior Publication Data

US 2024/0281550 A1 Aug. 22, 2024

(51) Int. Cl.
*G06F 21/62* (2013.01)

(52) U.S. Cl.
CPC ................................ *G06F 21/6218* (2013.01)

(58) Field of Classification Search
None
See application file for complete search history.

(56) References Cited

U.S. PATENT DOCUMENTS

| | | | | |
|---|---|---|---|---|
| 5,615,277 | A | 3/1997 | Hoffman | |
| 2018/0043266 | A1* | 2/2018 | Nakamura | A63F 13/52 |

FOREIGN PATENT DOCUMENTS

| | | |
|---|---|---|
| JP | 2003509775 | 3/2003 |
| JP | 2007293747 | 11/2007 |
| WO | WO 2016136626 | 9/2016 |

OTHER PUBLICATIONS

Ishii, "The 'Strong-tied' SNS and 'Weak-tied' SNS: A Comparison Regarding the Disclosure of Personal Information and Personal Relationships," Journal of the Institute of Information and Communication Engineers, 2011, 29(3):25-36, 25 pages (with machine translation).

Orita, "Anonymity on Social Media," Artificial Intelligence Society Journal, Jan. 2012, 27(1):59-66, 17 pages (with machine translation).

* cited by examiner

*Primary Examiner* — Brandon Hoffman
(74) *Attorney, Agent, or Firm* — Fish & Richardson P.C.

(57) ABSTRACT

A data processing method of an embodiment is used in an online communication system. The data processing method includes registering a registration name and a pseudonym in a user database of the online communication system for each user, displaying the registration name on a display device as a user name of a user who is permitted to disclose information with each other (S23), and displaying the pseudonym on the display device as a user name of a user who is not permitted to disclose information with each other (S24).

9 Claims, 9 Drawing Sheets

START

READ COMMUNICATION LOG AND DISPLAY COMMUNICATION CONTENTS ~S20

CONFIRM USER ID RELATED TO READ COMMUNICATION LOG ~S21

CONFIRM DISCLOSURE SETTING OF CONFIRMED USER ID AND USER IDS OF BROWSERS ~S22

DISPLAY REGISTRATION NAME IN USER DATABASE 31 AS USER NAME OF USER ID WHICH IS DISCLOSURE PERMISSION SETTING MUTUALLY ~S23

DISPLAY PSEUDONYM IN USER DATABASE 31 AS USER NAME OF USER ID WHICH IS DISCLOSURE NON-PERMISSION SETTING MUTUALLY ~S24

END

| USER INFORMATION | | | | DISCLOSURE SETTING | | | |
|---|---|---|---|---|---|---|---|
| USER ID | REGISTRATION NAME | PSEUDONYM | INFORMATION BEFORE DISCLOSURE | 1001 | 1002 | 1003 | ··· |
| 1001 | XXX | CAT | – | | 1 | 1 | ··· |
| 1002 | YYY | RABBIT | – | 1 | | 0 | ··· |
| 1003 | ZZZ | BEAR | – | 0 | 0 | | ··· |
| 1004 | WWW | DOG | – | 0 | 0 | 0 | ··· |
| ⋮ | ⋮ | ⋮ | ⋮ | ⋮ | ⋮ | ⋮ | ⋮ |

| USER ID | DATE AND TIME | COMMUNICATION CONTENTS |
|---|---|---|
| 1001 | Y/M/D | (TEXT etc.) |
| 1002 | Y/M/D | (TEXT etc.) |
| 1001 | Y/M/D | (TEXT etc.) |
| 1003 | Y/M/D | (TEXT etc.) |
| ⋮ | ⋮ | ⋮ |

DATA PROCESSING METHOD, DATA PROCESSING APPARATUS, AND DATA PROCESSING PROGRAM

CROSS-REFERENCE TO RELATED APPLICATIONS

This application is a National Stage application under 35 U.S.C. § 371 of International Application No. PCT/JP2021/023459, having an International Filing Date of Jun. 21, 2021. The disclosure of the prior application is considered part of the disclosure of this application, and is incorporated by reference in its entirety into this application.

TECHNICAL FIELD

The present invention relates to a data processing method, a data processing device, and a data processing program.

BACKGROUND ART

Friend relationships in a community where unknown people gather such as new students of a university are established by gradually disclosing mutual information among people in physically close places through daily life exchange such as lesson contents and topics of the world, for example. On the other hand, a situation in which direct meeting exchange is restricted and a method of establishing friend relationships is restricted only to online communication may be assumed. As techniques used in online communication, social networking service (SNS) and an anonymous bulletin board using a true name or a false name (e.g., a handle name) are known.

CITATION LIST

Non Patent Literature

[NPL 1] Kenichi Ishii, "The "Strong-tied" SNS and "Weak-tied" SNS: A Comparison Regarding the Disclosure of Personal Information and Personal Relationships", [online], Mar. 25, 2012, the Journal of the Institute of Electronics, Information and Communication Engineers Vol. 29 No. 3 (2011), [retrieval on Jun. 8, 2021], Internet <URL: https://www.jstage.jst.go.jp/article/jsicr/29/3/29_3_3_25/pdf/-char/ja>

[NPL 2] Akiko Orita, "Anonymity on Social Media, (<special collection> Twitter and social media=", [online], January 2012, Journal of Japanese Society for Artificial Intelligence Vol. 27 No. 1 (January 2012), [retrieval on Jun. 8, 2021], Internet <URL: https://www.jstage.jst.go.jp/article/jjsai/27/1/27_59/_pdf/-char/ja>

SUMMARY OF INVENTION

Technical Problem

However, the SNS first discloses personal information to the entire community, so that there is an unintended personal specific risk. Therefore, the psychological hurdle related to the use of the SNS by the user is high. On the other hand, anonymous bulletin boards have a problem of not being able to establish a relationship with a specific person because the communication is anonymous.

Then, an object of the present invention is to create an online communication system that establishes friend relationships with specific others while communicating without disclosing personal information to the entire community.

Solution to Problem

A data processing method of an embodiment is used in an online communication system. The data processing method includes registering a registration name and a pseudonym in a user database of an online communication system for each user, displaying the registration name on a display device as a user name of a user who is permitted to disclose information with each other, and displaying the pseudonym on the display device as a user name of a user who is not permitted to disclose information with each other.

Advantageous Effects of Invention

The data processing method of the embodiment can achieve communication in a state where personal information is disclosed to specific others without disclosing the personal information to the entire community.

BRIEF DESCRIPTION OF DRAWINGS

FIG. 5 is a table showing an example of a user database stored in a storage unit included in the online communication system according to the embodiment.

FIG. 6 is a table showing an example of a communication log database stored in the storage unit included in the online communication system according to the embodiment.

DESCRIPTION OF EMBODIMENTS

Figure 1:
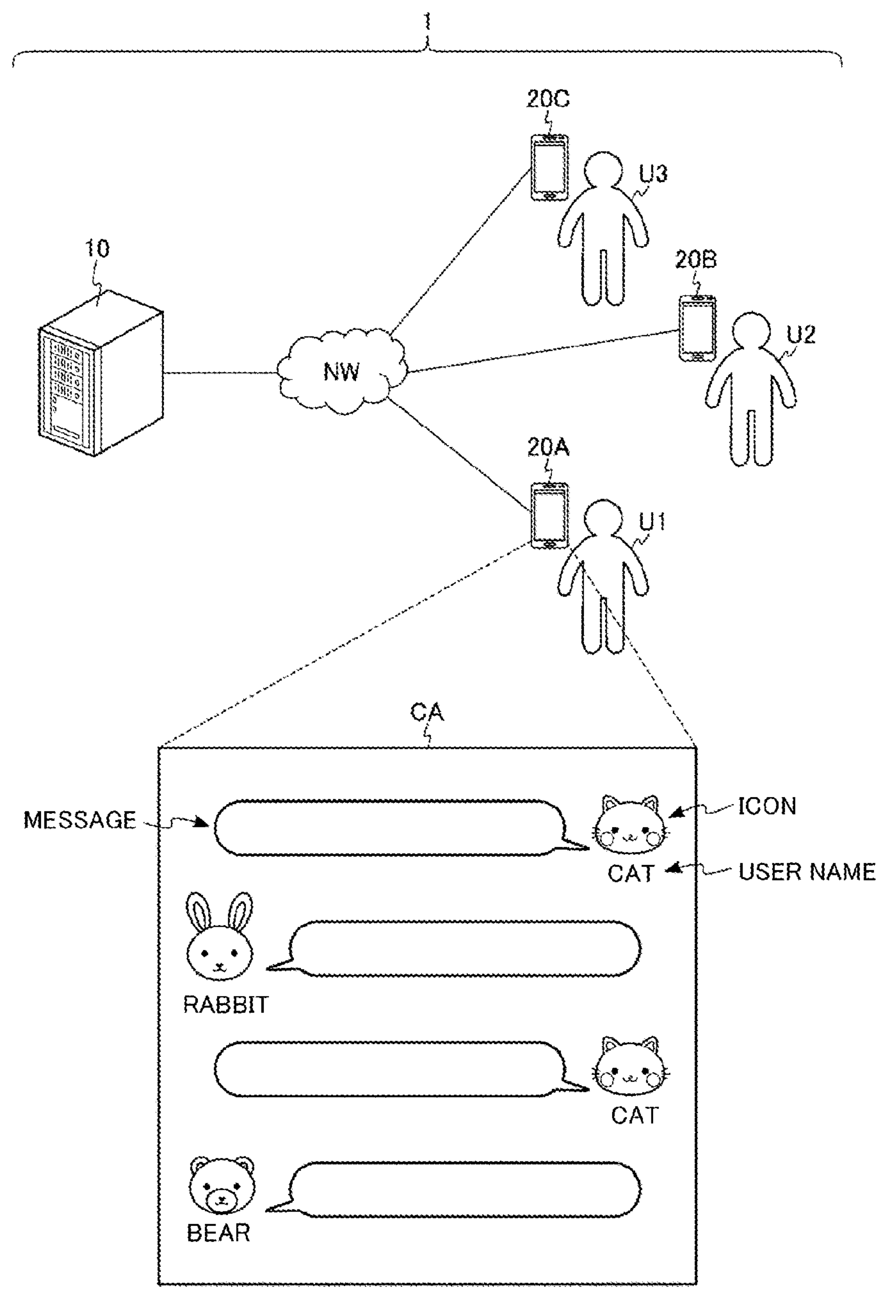
FIG. 1 is a schematic diagram showing a use example of an online communication system according to an embodiment.

Embodiments will be described hereinafter with reference to the drawings. Each embodiment exemplifies a device or method for embodying the technical idea of the invention. The drawings are schematic or conceptual. In the following description, the same reference numerals are given to components having substantially the same function and configuration.

Embodiment

An online communication system 1 according to an embodiment provides communication means such as a bulletin board and an SNS that may be used for online communication between a number of users. The details of the online communication system 1 according to the embodiment will be described below. In the present specification, "true name" corresponds to the name of the user on the true world, such as real name. "False name (another name)" corresponds to the name created by the user, such as a handle name. "Anonymity" corresponds to the name common to all users which is set so that it is not known by which user the contribution was made or the state in which the name is not displayed.

<1> Configuration

FIG. 1 is a schematic diagram showing a use example of the online communication system 1 according to an embodiment. As shown in FIG. 1, the online communication system 1 includes, for example, a server device 10 and at least one terminal device 20. The server device 10 and at least one terminal device 20 are configured to be communicable via a network NW. In this example, three terminal devices 20A, 20B and 20C are connected to the network NW. For example, the terminal devices 20A, 20B, and 20C are portable terminals managed and possessed by users U1, U2 and U3, respectively.

The online communication system 1 provides a communication means between a plurality of users U1 to U3 by a communication application CA, for example. The users U1 to U3 can exchange messages in a text format between the plurality of users like a bulletin board or an SNS by using the communication application CA. For example, when message exchange occurs between the plurality of users, the communication application CA associates each message with a user name that has contributed the message, and causes the terminal device 20 to display the message. In the online communication system 1, the user name displayed on the terminal device 20 at this time is changed depending on disclosure setting for each user. An operation will be described later in detail. Note that the communication application CA may display an icon together with the user name on the terminal device 20.

<1-1> Hardware Configuration of Server Device 10

Figure 2:
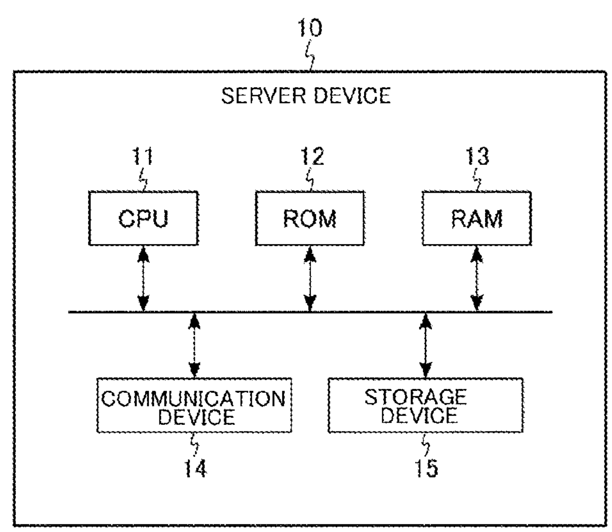
FIG. 2 is a block diagram showing an example of a hardware configuration of a server device according to the embodiment.

FIG. 2 is a block diagram showing an example of a hardware configuration of the server device 10 according to the embodiment. As shown in FIG. 2, the server device 10 includes, for example, a CPU (Central Processing Unit) 11, a ROM (Read Only Memory) 12, a RAM (Random Access Memory) 13, a wireless communication device 14, and a storage device 15.

The CPU 11 is an integrated circuit capable of executing various programs. The CPU 11 realizes a part of function of the online communication system 1 by executing a program developed in, for example, the RAM 13.

The ROM 12 is a non-volatile semiconductor memory. The ROM 12 stores programs and control data for controlling the server device 10.

The RAM 13 is a volatile semiconductor memory, for example. The RAM 13 is used as a working region of the CPU 11.

The communication device 14 is a communication circuit configured to be connectable to the network NW. The server device 10 transfers the message data or the like received via the communication device 14 to the storage device 15.

The storage device 15 is a volatile storage device. The storage device 15 stores, for example, user data and communication logs related to the communication application CA.

<1-2> Hardware Configuration of Terminal Device 20

Figure 3:
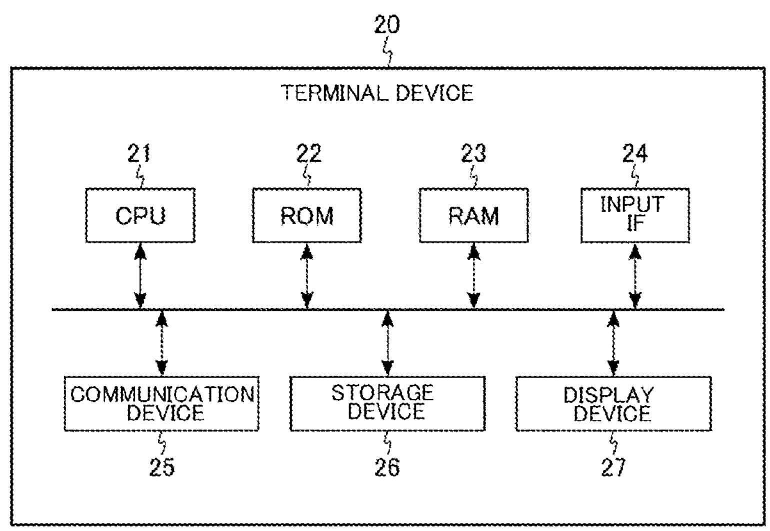
FIG. 3 is a block diagram showing an example of a hardware configuration of a terminal device according to the embodiment.

FIG. 3 is a block diagram showing an example of a hardware configuration of the terminal device 20 according to the embodiment. As shown in FIG. 3, the terminal device 20 includes, for example, a CPU 21, a ROM 22, a RAM 23, an input interface (an input IF) 24, a communication device 25, a storage device 26, and a display device 27.

The CPU 21 is an integrated circuit capable of executing various programs. The CPU 21 realizes a part of function of the online communication system 1 by executing a program developed in, for example, the RAM 23.

The ROM 22 is a non-volatile semiconductor memory. The ROM 22 stores programs and control data for controlling the terminal device 20.

The RAM 23 is a volatile semiconductor memory, for example. The RAM 23 is used as a working region of the CPU 21.

The input interface 24 is input equipment used for inputting various information to the communication application CA and for inputting a message or the like.

The communication device 25 is a communication circuit configured to be connectable to the network NW by wireless or wired. The communication device 25 transmits message data or the like to the server device 10 via the network NW, and receives communication logs or the like from the server device 10.

The storage device 26 is a non-volatile storage device. The storage device 26 stores, for example, cache data of communication logs related to the communication application CA.

The display device 27 is a display capable of displaying information on the communication application CA. Various forms of displays may be used as the display device 27. The display device 27 may be used as the input interface 24 when having a touch panel function.

<1-3> Functional Configuration of Online Communication System 1

Figure 4:
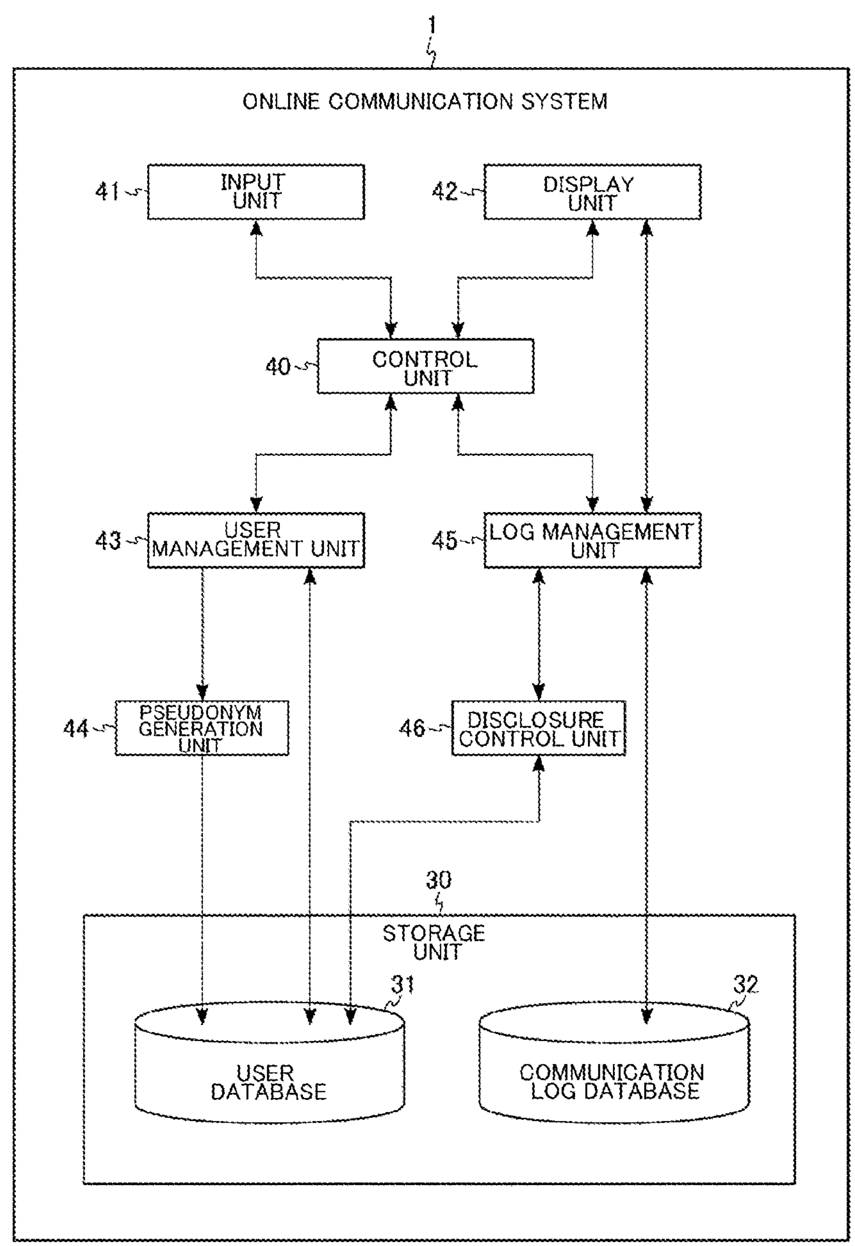
FIG. 4 is a block diagram showing an example of a functional configuration of the online communication system according to the embodiment.

FIG. 4 is a block diagram showing an example of a functional configuration of the online communication system 1 according to the embodiment. As shown in FIG. 4, the online communication system 1 includes, for example, a storage unit 30, a control unit 40, an input unit 41, a display unit 42, a user management unit 43, a pseudonym generation unit 44, a log management unit 45, and a disclosure control unit 46.

The storage unit 30 corresponds to, for example, the storage device 15 of the server device 10, and stores data managed by the communication application CA. Specifically, the storage unit 30 stores a user database 31 and a communication log database 32. The user database 31 includes information on a user who uses the communication application CA. The communication log database 32 includes information such as a message contributed via the communication application CA, and records communication contents such as a bulletin board and an individual chat, for example.

The control unit 40 corresponds to, for example, the CPU 21 of the terminal device 20 and controls the entire operation of the online communication system 1. For example, the control unit 40 executes the communication application CA and causes the display unit 42 to display a user interface of the communication application CA. In addition, the control unit 40 controls the user management unit 43 and the log management unit 45 on the basis of the instruction received from the input unit 41.

The input unit 41 corresponds to the input interface 24 of the terminal device 20 and transfers a signal based on user's operation to the control unit 40. Specifically, the input unit 41 transfers personal information, messages, and the like inputted by the user to the control unit 40.

The display unit 42 corresponds to the display device 27 of the terminal device 20 and can be browsed by a user. The display unit 42 displays an image based on the instruction of the control unit 40 and the log management unit 45.

The user management unit 43 corresponds to the CPU 11 of the server device 10 or the CPU 21 of the terminal device 20 and manages information on a user who uses the online communication system 1. The user management unit 43 can update the user database 31 on the basis of user registration processing to be described later and a user's request.

The pseudonym generation unit 44 corresponds to the CPU 11 of the server device 10 or the CPU 21 of the terminal device 20, and generates a pseudonym associated with a new user when the new user is registered in the online communication system 1. The pseudonym is a name unique to the online communication system 1. Then, the generated pseudonym is registered in the user database 31 in association with the new user.

The log management unit 45 corresponds to the CPU 11 of the server device 10 or the CPU 21 of the terminal device 20 and manages processing related to the communication logs of the online communication system 1. The log management unit 45 can update the communication log database 32 on the basis of the contribution of the message or the like by the user. In addition, the log management unit 45 can display the user name associated with the communication logs on the display unit 42 in a desired state by log display processing to be described later.

The disclosure control unit 46 corresponds to the CPU 11 of the server device 10 or the CPU 21 of the terminal device 20, and refers to the user database 31 on the basis of the instruction of the log management unit 45. For example, the disclosure control unit 46 instructs the log management unit 45 to display the user name corresponding to a disclosure state set for a user of a browser and a disclosure state set for another user.

<1-4> Configuration of User Database 31

FIG. 5 is a table showing an example of the user database 31 stored in the storage unit 30 included in the online communication system 1 according to the embodiment. As shown in FIG. 5, the user database 31 includes user information and disclosure settings. The user information includes, for example, a "user ID (Identifier)", a "registration name", a "pseudonym", and "information before disclosure".

The user ID is an identifier assigned to each user of the online communication system 1. In this example, "1001", "1002", "1003", and "1004" are assigned as the user ID. As the user ID, any other format may be used as long as the user ID can be identified for each user.

The registration name is a name inputted by the user when registering the user in the online communication system 1. As the registration name, for example, a true name, a false name (another name), or the like is used. In this example, as the registration name inputted for each user, "XXX", "YYY", "ZZZ", and "WWW" are registered in association with the user IDs "1001", "1002", "1003", and "1004", respectively.

The pseudonym is a name automatically generated by the online communication system 1 at the time of user registration, and is generated without the intention of the user. In this example, as the automatically generated pseudonyms, "Cat", "Rabbit", "Bear", and "Dog" are registered in association with the user IDs "1001", "1002", "1003", and "1004", respectively.

The information before disclosure is personal information inputted by the user at the user registration. The information before disclosure may also be referred to by other users in a disclosure non-permission state, which will be described later. Note that in the user database 31, the information before disclosure may be omitted or a plurality of types of information before disclosure may be provided.

The disclosure setting stores disclosure setting for other user IDs registered in the user database 31 for each user ID. In this example, in the user database 31, the node "0" is assigned to the disclosure non-permission setting, and the node "1" is assigned to the disclosure permission setting. The online communication system 1 may use other methods as registration methods of disclosure settings if the disclosure settings of the user can be identified.

<1-5> Configuration of Communication Log Database 32

FIG. 6 is a table showing an example of the communication log database 32 stored in the storage unit 30 of the online communication system 1 according to the embodiment. As shown in FIG. 6, the communication log database 32 includes, for example, a "user ID", a "date and time", and a "communication content" for each created community.

In the communication log database 32, the "user ID" corresponds to the ID of the user who has contributed the message or the like. The "date and time" indicates the date and time (Y/M/D) at which the communication content contributed by a certain user is registered in the communication log database 32, for example. The "communication content" corresponds to a text or the like (a message or the like) contributed by a certain user. In this way, the communication log database 32 may record a set of the communication content and the user ID in time series.

<2> Operations

The online communication system 1 according to the embodiment, on the basis of a display in "pseudonym" or "no-name" for a user name associated with a communication log, discloses "false name, another name" or "true name" only between users who have interest. Hereinafter, the details of operations of the online communication system 1 according to the embodiment will be described.

<2-1> Flow of User Registration Processing

Figure 7:
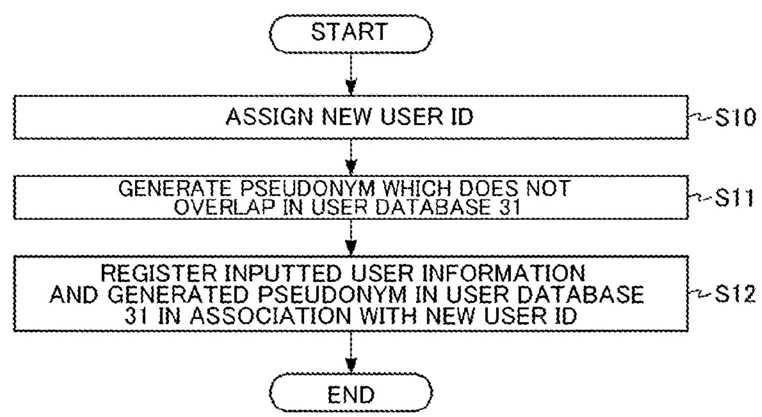
FIG. 7 is a flowchart showing an example of user registration processing of the online communication system according to the embodiment.

FIG. 7 is a flowchart showing an example of user registration processing of the online communication system 1 according to the embodiment. The flow of the user registration processing of the online communication system 1 according to the embodiment will be described below with reference to FIG. 7.

The user management unit 43 starts the user registration processing in response to user registration operation to the online communication system 1 by the user (start).

First, the user management unit 43 assigns a new user ID to this user registration processing (step S10). The new user ID is set so as not to overlap with existing user IDs already used in the online communication system 1.

Then, the user management unit 43 makes the pseudonym generation unit 44 generate a pseudonym which does not overlap in the user database 31 (step S11). The pseudonym generation unit 44 may generate the pseudonym by a combination of specific words and phrases, or may change the type of pseudonym usable for each community. An example of the pseudonym is "Blue Bear". The pseudonym generation unit 44 generates the pseudonym unique on the online communication system 1 by adding qualifying words and phrases (e.g., "Blue") indicating a color to a name (e.g., "Bear") generated as a base name, for example.

Next, the user management unit 43 registers the inputted user information and the generated pseudonym in the user database 31 in association with the new user ID (step S12). Specifically, the user management unit registers the new user ID and registers the "registration name" inputted by the user, the "pseudonym" generated by the pseudonym generation unit 44, and the disclosure setting between the new user ID and the existing users in association with the new user ID in the user database 31. Initial setting of disclosure setting between the user ID and the existing user ID is, for example, "0" (disclosure non-permission). The initial setting of the disclosure setting may be configured to be changeable according to a user's desire.

When the processing of the step S12 is completed, the user management unit 43 ends a series of processing shown in FIG. 7 (end).

<2-2> Flow of Log Display Processing

Figure 8:
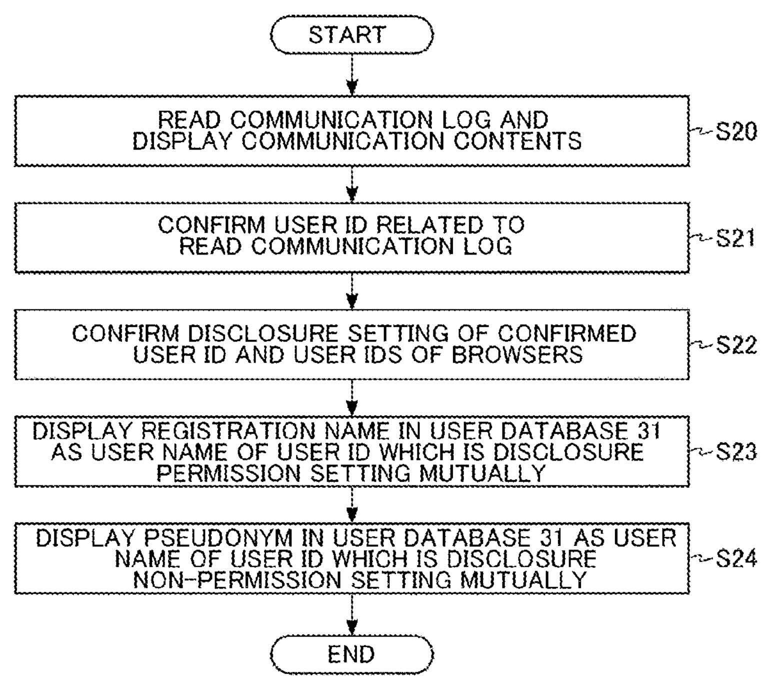
FIG. 8 is a flowchart showing an example of log display processing of the online communication system according to the embodiment.

FIG. 8 is a flowchart showing an example of log display processing of the online communication system 1 according to the embodiment. The flow of log display processing of the online communication system 1 according to the embodiment will be described below with reference to FIG. 8.

The log management unit 45 starts display processing (start) in response to detection of access to the communication log by the user.

First, the log management unit 45 reads the communication log designated by the user from the communication log database 32, and displays the communication content of the read communication log on the display unit 42 (step S20).

Then, the log management unit 45 confirms the user ID related to the read communication log (step S21). In other words, the log management unit 45 confirms the user ID that has contributed the message to the communication log. Note that when the communication log is in a form like a community in which a plurality of user IDs participate, the log management unit 45 may confirm all the user IDs belonging to the community.

Next, the log management unit 45 makes the disclosure control unit 46 confirm the disclosure setting of the confirmed user ID and the user IDs of the browsers (step S22). Specifically, the disclosure control unit 46 refers to the user database 31 and compares the disclosure setting associated with the user IDs of the browsers with the disclosure setting associated with the confirmed user ID. Then, the disclosure control unit 46 confirms whether or not the disclosure settings are disclosure permission settings mutually between each of the user IDs of the browsers and the confirmed user ID.

Next, the log management unit 45 displays the registration name in the user database 31 on the display unit 42 as the user name of the user ID which is disclosure permission setting mutually (step S23). For example, the log management unit 45 makes the display unit 42 display the registration name associated with the user ID in association with the message contributed by the user ID whose disclosure permission setting is mutually confirmed by the disclosure control unit 46.

Next, the log management unit 45 displays the registration name in the user database 31 on the display unit 42 as the user name of the user ID which is disclosure non-permission setting mutually (step S24). For example, the log management unit 45 makes the display unit 42 display the registration name associated with the user ID in association with the message contributed by the user ID whose disclosure non-permission setting is mutually confirmed by the disclosure control unit 46.

When the processing in step S24 is ended, the log management unit 45 ends a series of processing shown in FIG. 8 (end).

<2-3> Specific Example of Online Communication System 1

Figure 9:
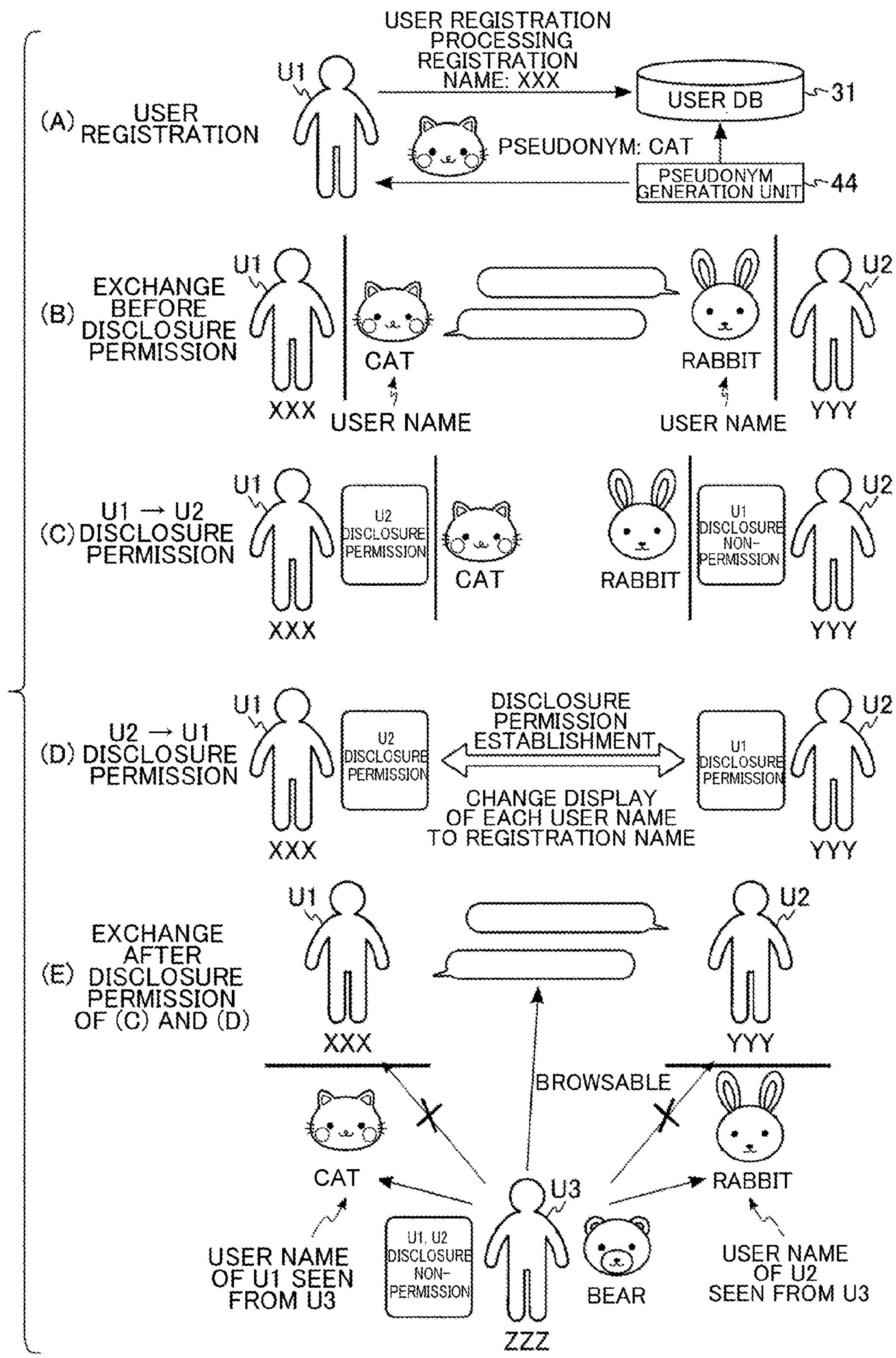
FIG. 9 is a schematic diagram showing a specific example for using the online communication system according to the embodiment.

FIG. 9 is a schematic diagram showing a specific example of the use of the online communication system 1 according to the embodiment. Hereinafter, referring to FIGS. 9(A), (B), (C), (D) and (E) arranged in a time-series order, the specific example of the use of the online communication system 1 according to the embodiment will be described.

FIG. 9(A) shows the outline of the user registration processing by the user U1. In this example, the user U1 performs user registration to the online communication system 1 by using the registration name "XXX". Then, the registration name "XXX" is registered in the user database (user DB) 31 in association with the new user ID. Then, the pseudonym generation unit 44 generates a pseudonym "Cat" which is not present in the user database 31 in association with the new user ID, and registers the pseudonym "Cat" in the user database 31. Although a figure is omitted, in this example, the users U2 and U3 also perform the user registration in the same manner, and the registration name "YYY" and the pseudonym "Rabbit" of the user U2 and the registration name "ZZZ" and the pseudonym "Bear" of the user U3 are registered in the user database 31.

FIG. 9(B) shows the situation of exchange between the users U1 and U2 before mutual disclosure permission. At this time, a user name (disclosure state) displayed between the users U1 and U2 is pseudonym (initial state). Specifically, when a message is contributed by each of the users U1 and U2, the disclosure control unit 46 confirms that a disclosure state between the users U1 and U2 is a "disclosure non-permission". As a result, the terminal device 20 of the user U1 displays the pseudonym "Rabbit" as the user name of the user U2, and the terminal device 20 of the user U2 displays the pseudonym "Cat" as the user name of the user U1. In this way, in the initial state, communication by the pseudonym is performed between the users. Each user can distinguish the opposite party by the pseudonym assigned to each user. Note that each user can also contribute a message or the like by optionally using anonymity (no-name).

FIG. 9(C) shows the situation when the disclosure of the personal information to the pseudonym "Rabbit" (user U2)

is permitted by the user U1 (U1→U2 disclosure permission). In this example, when the user U1 registers disclosure permission to the pseudonym "Rabbit" (U2 disclosure permission), the user U2 does not register the disclosure permission to the user U1 (U1 disclosure non-permission). That is, since the users U1 and U2 are not set to permit disclosure with each other, the user name displayed by the exchange between the users U1 and U2 is maintained as the pseudonym. Note that each user can also register disclosure permission for a specific message contributed using anonymity (no-name). The disclosure permission of the personal information to the user U2 by the user U1 may be notified to the user U2 or may not be notified.

FIG. 9(D) shows a situation when the disclosure of personal information to the pseudonym "Cat" (user U1) is permitted by the user U2 (U2→U1 disclosure permission). When the user U1 registers disclosure permission for the pseudonym "Rabbit", disclosure settings between the user U1 and the user U2 mutually become disclosure permission setting (disclosure permission establishment/matching establishment). Then, display of mutual user names between the users U1 and U2 is changed to the registration name (true name or the like). Specifically, when the message is contributed by each of the users U1 and U2, the disclosure control unit 46 confirms that a disclosure state between the users U1 and U2 is a "disclosure permission". As a result, the registration name "YYY" is displayed as the user name of the user U2 on the terminal device 20 of the user U1, and the registration name "XXX" is displayed as the user name of the user U1 on the terminal device 20 of the user U2. In addition, after the matching is established, personal information after disclosure permission registered for each user can be browsed between the users U1 and U2.

FIG. 9(E) shows a situation when a user U3, who is in a disclosure non-permission relationship with both the users U1 and U2, browses the exchange after disclosure permission of (C) and (D) in FIG. 9. At this time, when each of the users U1 and U2 contributes the message, the user name displayed between the users U1 and U2 is the registration name as described with reference to FIG. 9(D). On the other hand, the user U3 can browse the respective messages of the users U1 and U2, but is in the disclosure non-permission relationship (U1, U2 disclosure non-permission) with both the users U1 (pseudonym: Cat) and U2 (pseudonym: Rabbit). Therefore, the user name of the user U1 seen from the user U3 is the pseudonym "Cat", and the user name of the user U2 seen from the user U3 is the pseudonym "Rabbit". Similarly, the user name of the user U3 seen from each of the users U1 and U2 is the pseudonym "Bear". That is, the registration name is displayed between the users who have established the matching, and the pseudonym or the anonymity is displayed between the users who have not established the matching.

<3> Effects of Embodiment

In the online communication system 1 according to the embodiment, since the pseudonym of each user is automatically generated, a risk of individual identification of the user by unspecified other persons is suppressed. As a result, the user can lower the psychological hurdle of communication using the online communication system 1. Further, the user can perform communication in which the opposite party is distinguished by referring to the pseudonym assigned to each user. Further, the user can perform more intimate exchange with the specific user who has made the disclosure permission setting with each other by setting the disclosure permission setting to an arbitrary user, and the online communication system 1 can be utilized for establishing friend relationships.

In addition, the online communication system 1 can also cope with contribution and reaction using anonymity (no-name). That is, the user can view a reaction from another user by contributing using anonymity (no-name) to the online communication system 1. Then, the user can also set disclosure permission to the user who has contributed using anonymity (no-name). Thus, the user can make the interest in the specific hobby and topic as the starting point of communication and can be linked to the establishment of new human relationships.

As described above, the data processing method used in the online communication system 1 according to the embodiment does not disclose the personal information to the entire community, and can realize communication in a state where the personal information is disclosed to specific other persons.

Note that the online communication system 1 can be set to non-notification that the disclosure permission has been registered between users. The setting of non-notification of the registration of the disclosure permission can reduce, for example, a psychological stress received by a user who makes the disclosure permission in which "the notification may look like requesting the disclosure permission to the other party", and a psychological stress received by a user who received the disclosure permission in which "since the disclosure is registered, it may be rude if the disclosure permission is not made in this side".

<4> Modification Example Etc

In the embodiments, the case where the disclosure settings are two types, i.e., the "disclosure permission" or the "disclosure non-permission" is exemplified, the invention is not limited to this. The online communication system 1 may set three or more types of levels of disclosure permission designating an opposite party. More specifically, just as there are levels in human relationships, there may be a plurality of types of disclosure levels in the disclosure settings, such as "stranger (initial state)", "acquaintance", and "friend", for example. When a plurality of types of disclosure levels is provided, a user registers personal information disclosed for each disclosure level in the user database 31. For example, the online communication system 1 displays or does not display personal information corresponding to the level of disclosure permission when the levels of the mutual disclosure permission are the same. In addition, when one disclosure permission level is higher than the other disclosure permission level, the online communication system 1 displays personal information corresponding to, for example, the lower disclosure permission level between the users.

When the user has a two-choice of the "disclosure non-permission (pseudonym)" or "disclosure permission (registration name)", the user may forget what types of communications the user has performed with the pseudonym before (for example, the user of the pseudonym with which the exchange has been performed before, or the user of the pseudonym with which the exchange has been performed for the first time). Therefore, the online communication system 1 may have a function of recording the communication history and the relationship with other users in an application which is not shown by others. In other words, the online communication system 1 may have a function of displaying a communication implementation history in addition to the display of the user information. Thus, the user can confirm the communication history for each pseudonym, and the human relationship with the opposite party in the pseudonym state can be easily deepened. In addition, when the disclosure permission setting is mutually made, the pseudonym may be written together with the registration name. Thus, the user can communicate with the unspecified number of persons without inconvenience even when the user displaying the registration name is called as the pseudonym.

Although the online communication system 1 is used for exchanging messages as a use example in the embodiment, the online communication system 1 may be used for exchanging illustration images and various data files. The online communication system 1 is not limited to use in an environment which can be browsed by a plurality of persons such as a community and a thread of a bulletin board, but may be used for one-to-one exchange. Although the embodiments exemplify the case where the user uses the communication application CA, the operations described in the embodiments may be provided as a Web service such as a bulletin board or SNS. In each of the flowcharts shown in FIG. 7 and FIG. 8, the processing order may be changed within a possible range or other processing may be added as long as the result similar to that of the embodiment is obtained.

The hardware configuration of each of the server device 10 and the terminal device 20 described in the embodiment may be any other configuration as long as the operation described in the embodiment can be realized. The classification of the functional configuration of the online communication system 1 described in the embodiment is only an example. Each of the CPU 11 provided in the server device 10 and the CPU 21 provided in the terminal device 20 may be other circuits. For example, an MPU (Micro Processing Unit), an ASIC (Application Specific Integrated Circuit), or an FPGA (field-programmable gate array) may be used instead of the CPUs 11 and 21. The operations described in the embodiment may be realized by the dedicated hardware or realized by a mixture of processing performed by software and processing performed by hardware or by only one of them. In the present specification, the server device 10 may be called a "data processing device", a "data processing server", and a "server". The CPUs 11 and 21 may be called a "processor". Each of the ROMs 12 and 22, the RAMs 13 and 23, and the storage devices 15 and 26 may be called a "storage circuit".

Note that the present invention is not limited to the embodiments described above and can variously be modified at an execution stage within a scope not departing from the gist of the present invention. In addition, each of the embodiments may be combined appropriately, and in such a case, advantageous effects of the combinations can be obtained. Further, the foregoing embodiments include various inventions, and various inventions can be extracted by selecting combinations of the plurality of constituent elements disclosed herein. For example, even if several constituent elements are removed from all the constituent elements described in the embodiments, configurations in which those constituent elements are removed can be extracted as an invention as long as the problem can be solved and the advantageous effects can be obtained.

REFERENCE SIGNS LIST

1 Online communication system
10 Server device
20 Terminal device
11, 21 CPU
12, 22 ROM
13, 23 RAM
14, 25 Communication device
15, 26 Storage device
24 Input interface
27 Display device
30 Storage unit
31 User database
32 Communication log database
40 Control unit
41 Input unit
42 Display unit
43 User management unit
44 Pseudonym generation unit
45 Log management unit
46 Disclosure control unit

The invention claimed is:

1. A method comprising:

registering a plurality of registration names and a plurality of pseudonyms in a database of an online communication system for a plurality of users, which comprise a first user and a second user;

displaying (i) a respective pseudonym of the first user on a display device of the second user and (ii) a respective pseudonym of the second user on a display device of the first user;

receiving first disclosure permission of the respective pseudonym of the second user from the display device of the first user;

receiving second disclosure permission of the respective pseudonym of the first user from the display device of the second user, wherein the first disclosure permission is a lower security level than a security level of the second disclosure permission;

in response to receiving the first disclosure permission and the second disclosure permission, determining a permission is established between the display device of the first user and the display device of the second user according to the second disclosure permission; and in response to determining the permission is established, displaying (i) the registration name of the first user on the display device of the second user and (ii) the registration name of the second user on the display device of the first user.

2. The method according to claim 1, wherein each pseudonym of the plurality of pseudonyms registered in the database is automatically generated so as not to overlap when a subsequent registration is performed in the online communication system.

3. The method according to claim 1, further comprising:

setting a plurality of permission levels as disclosure permission levels of information between each user of the plurality of users; and displaying, by the display device, information corresponding to a permission level of the first user to the display device of the second user and a permission level of the second user to the display device of the first user.

4. A data processing device comprising one or more processors configured to:

register a plurality of registration names and a plurality of pseudonyms in a database of an online communication system for a plurality of users, which comprise a first user and a second user;

display (i) a respective pseudonym of the first user on a display device of the second user and (ii) a respective pseudonym of the second user on a display device of the first user;

receive first disclosure permission of the respective pseudonym of the second user from the display device of the first user;

receive second disclosure permission of the respective pseudonym of the first user from the display device of the second user, wherein the first disclosure permission is a lower security level than a security level of the second disclosure permission;

in response to receiving the first disclosure permission and the second disclosure permission, determine a permission is established between the display device of the first user and the display device of the second user according to the second disclosure permission; and in response to determining the permission is established, display (i) the registration name of the first user on the display device of the second user and (ii) the registration name of the second user on the display device of the first user.

5. The data processing device according to claim 4, wherein each pseudonym of the plurality of pseudonyms registered in the database is automatically generated so as not to overlap when a subsequent registration is performed in the online communication system.

6. The data processing device according to claim 4, wherein the one or more processors are configured to:

set a plurality of permission levels as disclosure permission levels of information between each user of the plurality of users; and display, by the display device, information corresponding to a permission level of the first user to the display device of the second user and a permission level of the second user to the display device of the first user.

7. One or more non-transitory computer-readable media comprising instructions stored thereon that are executable by one or more processing devices and upon such execution cause the one or more processing devices to perform operations comprising:

registering a plurality of registration names and a plurality of pseudonyms in a database of an online communication system for a plurality of users, which comprise a first user and a second user;

displaying (i) a respective pseudonym of the first user on a display device of the second user and (ii) a respective pseudonym of the second user on a display device of the first user;

receiving first disclosure permission of the respective pseudonym of the second user from the display device of the first user;

receiving second disclosure permission of the respective pseudonym of the first user from the display device of the second user, wherein the first disclosure permission is a lower security level than a security level of the second disclosure permission;

in response to receiving the first disclosure permission and the second disclosure permission, determining a permission is established between the display device of the first user and the display device of the second user according to the second disclosure permission; and in response to determining the permission is established, displaying (i) the registration name of the first user on the display device of the second user and (ii) the registration name of the second user on the display device of the first user.

8. The one or more non-transitory computer-readable media according to claim 7, wherein each pseudonym of the plurality of pseudonyms registered in the database is automatically generated so as not to overlap when a subsequent registration is performed in the online communication system.

9. The one or more non-transitory computer-readable media according to claim 7, further comprising:

setting a plurality of permission levels as disclosure permission levels of information between each user of the plurality of users; and displaying, by the display device, information corresponding to a permission level of the first user to the display device of the second user and a permission level of the second user to the display device of the first user.

* * * * *